(12) United States Patent
Linkies

(10) Patent No.: US 9,914,254 B2
(45) Date of Patent: Mar. 13, 2018

(54) FILM PRODUCT

(71) Applicant: Windmöller & Hölscher KG, Lengerich (DE)

(72) Inventor: Jürgen Linkies, Lienen (DE)

(73) Assignee: WINDMÖLLER & HÖLSCHER KG, Lengerich (DE)

( * ) Notice: Subject to any disclaimer, the term of this patent is extended or adjusted under 35 U.S.C. 154(b) by 215 days.

(21) Appl. No.: 14/422,995

(22) PCT Filed: Jul. 23, 2013

(86) PCT No.: PCT/EP2013/065483
§ 371 (c)(1),
(2) Date: Feb. 20, 2015

(87) PCT Pub. No.: WO2014/029572
PCT Pub. Date: Feb. 27, 2014

(65) Prior Publication Data
US 2015/0217496 A1 Aug. 6, 2015

(30) Foreign Application Priority Data

Aug. 22, 2012 (DE) ........................ 10 2012 107 753

(51) Int. Cl.
*B32B 3/10* (2006.01)
*B29C 47/00* (2006.01)
(Continued)

(52) U.S. Cl.
CPC ...... *B29C 47/0057* (2013.01); *B29C 47/0066* (2013.01); *B29C 55/06* (2013.01);
(Continued)

(58) Field of Classification Search
None
See application file for complete search history.

(56) References Cited

U.S. PATENT DOCUMENTS

| 4,533,510 A | 8/1985 | Nissel |
| 2003/0177734 A1* | 9/2003 | Reames ............ B29C 45/14434 |
| | | 52/716.5 |

(Continued)

FOREIGN PATENT DOCUMENTS

| DE | 4238128 A1 | 5/1994 |
| DE | 19839007 A1 | 3/2000 |

(Continued)

OTHER PUBLICATIONS

Polymers—Opportunities and Risks I: General and Environmental Aspects edited by Peter Eyerer p. 200, 2010.*

(Continued)

*Primary Examiner* — Christopher Polley
(74) *Attorney, Agent, or Firm* — Porzio Bromberg & Newman P.C.

(57) ABSTRACT

The invention relates to a film product (10) comprising a substantially continuous extension with an upper side (12), a lower side (14) and two laterally extending edges (16a), characterised in that a continuous edge portion (20a) made from a first material is arranged on each of the two edges (16a) and a continuous main portion (30) made from a second material is arranged between the edge portions (20a), the first material having a higher surface adhesion than the second material.

10 Claims, 2 Drawing Sheets

(51) Int. Cl.
*B32B 27/08* (2006.01)
*B29C 55/06* (2006.01)
*B29D 7/01* (2006.01)
*B29C 47/06* (2006.01)
*B29L 7/00* (2006.01)

(52) U.S. Cl.
CPC ............... *B29D 7/01* (2013.01); *B32B 27/08* (2013.01); *B29C 47/0021* (2013.01); *B29C 47/062* (2013.01); *B29L 2007/00* (2013.01); *Y10T 428/24777* (2015.01)

(56) References Cited

U.S. PATENT DOCUMENTS

| | | | |
|---|---|---|---|
| 2004/0108621 A1* | 6/2004 | Kegasawa | B29C 47/0007 264/171.1 |
| 2005/0202198 A1 | 9/2005 | Hogan | |
| 2009/0241317 A1* | 10/2009 | Kubler | B65D 81/053 29/428 |

FOREIGN PATENT DOCUMENTS

| | | |
|---|---|---|
| EP | 0249073 A2 | 5/1987 |
| EP | 0707938 A2 | 4/1996 |
| EP | 0918362 A2 | 5/1999 |
| EP | 1232846 A1 | 2/2002 |
| EP | 1426164 A2 | 6/2004 |

OTHER PUBLICATIONS

Office Action dated Apr. 5, 2013 issued by German Patent and Trademark Office in DE102012107753.3 which is the corresponding German application of the present application.
Office Action dated Aug. 12, 2014 issued by the German Patent and Trademark Office in DE1020120107753.3 which is the corresponding German application of the present application.
Office Action dated issued by the German Patent and Trademark Office in DE1020120107753.3 which is the corresponding German application of the present application.
European Office Action, EP13742423.0, dated Aug. 11, 2016 (translation).

* cited by examiner

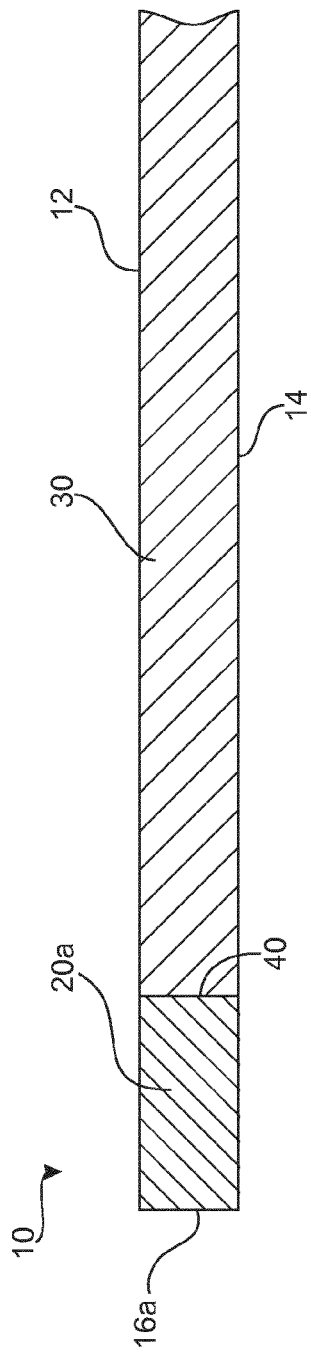
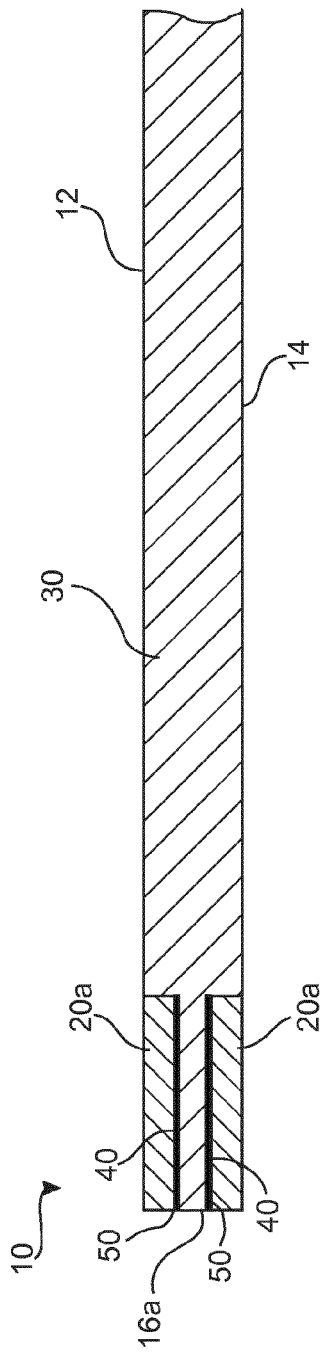
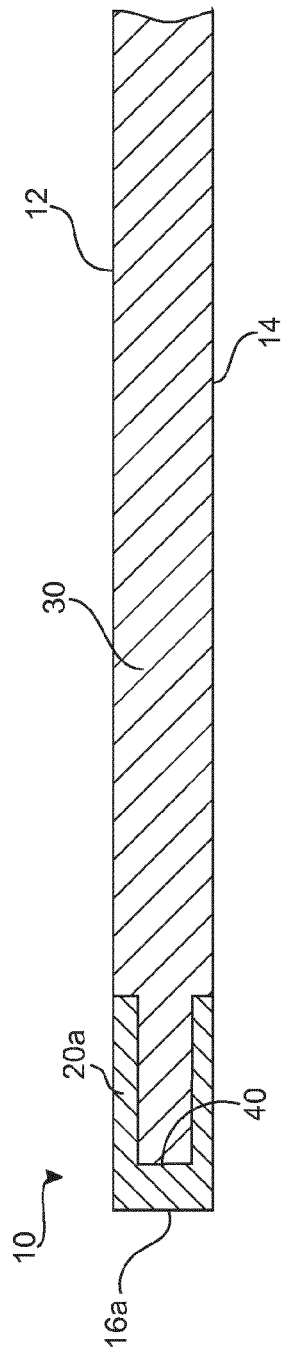

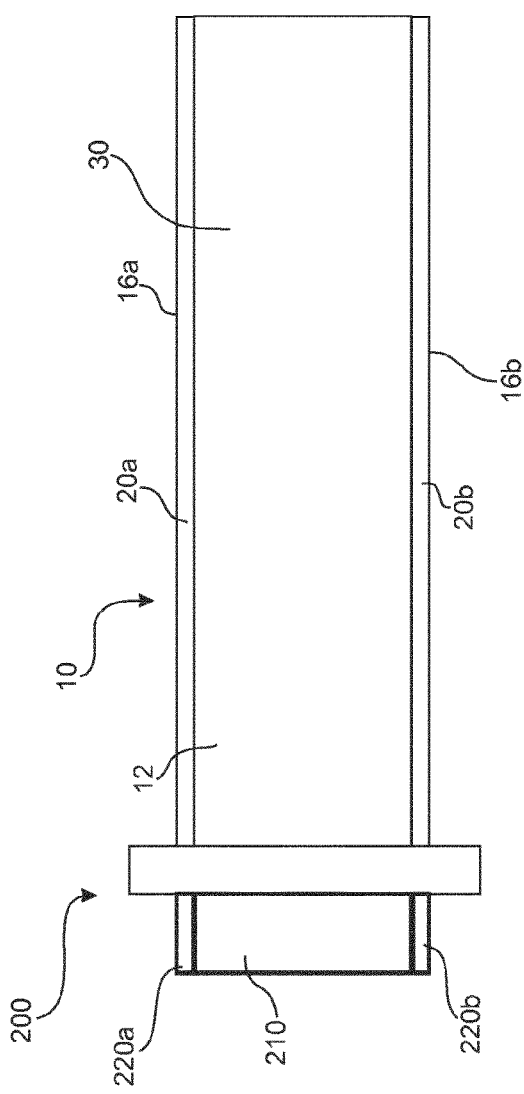
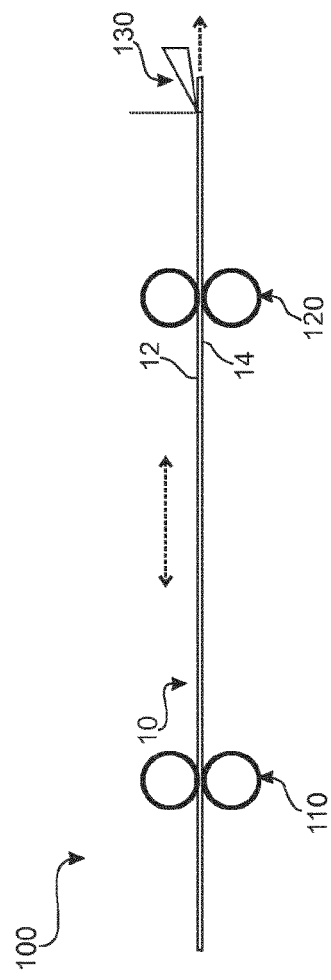
Fig. 4
Fig. 5

FILM PRODUCT

The present invention relates to a film product, a method for producing a film product and a method for stretch forming a film product.

Method for stretch forming of film products and corresponding methods for producing such film product and such film products itself are basically known. They are for example established in order to longitudinally stretch plastic film products and thereby increase the stability of such film products. Such a longitudinal stretch forming method is usually performed with at least two successive roller pairs. Thereby a first roller pair is assembled for the conveyance of the film product and a second subsequent roller pair is assembled for the further conveyance of the film product. The second roller pair thereby comprises a higher number of revolutions compared to the first roller pair, so that the film product is accelerated from the first roller pair to the second roller pair. This acceleration results in a longitudinal stretch or a stretch forming of the film product between both roller pairs.

It is a disadvantage of known methods and known film products that through longitudinal stretch forming a so-called Neck-In is produced, namely a constriction of the film product traverse to the stretch forming direction. This Neck-In can also affect the main section of the film product, so that by this means the quality of the stretch formed film product is reduced and even waste is produced. In order to face this problem with the known stretch forming method an active holding of the edges of the film product was performed. Thereby it is known that the edges of the film are retained with bracket-like means at the roller pairs. This requires however a very high constructive effort which moreover comprises high error rates concerning the input.

It is the objection of the present invention to at least partially resolve the subsequently described disadvantages. Particularly, it is the objection of the present invention to provide a film product, a method for the production of a film product and a method for stretch forming a film product which can reduce the risk of construction trouble travers to the stretch forming direction with particularly little efforts and especially cost-efficient and simple.

The subsequent objection is solved by a film product with the features of claim 1, a production method with the features of claim 8 and by a stretch forming method with the features of claim 11. Further features and details of the invention reside from the dependent claims, the description and the drawings. Thereby, features and details which are described in connection with the film product according to the invention apply naturally also in connection with the production method according to the invention and the stretch forming method and vice versa, so that concerning the disclosure of the single aspects of the invention it can be alternately be referred to.

A film product according to the invention comprises a mainly continuously extension with an upper side, a lower site and two lateral edges. A film product according to the invention is characterized by the fact that at each of both edges a continuous edge section from a first material and between the edge sections a continuous main section from the second material is assembled. Thereby, the first material comprises a higher surface adhesion as the second material.

In a manner according to the invention a successive extension preferably means a film product which is produced in a continuous or semi-continuous method. Further, the successive extension means, that although an end section exists, that starting from this the film product extends however mainly between the two lateral edges. The edges and also the upper side and the lower side thereby present restriction areas of the film product.

The edge sections or the main section are preferably each a volume section of the film product. The edge section and the main section preferably meet, so that the sum from both edge sections and the main sections together form the total volume of the product.

The scope of the present invention is to particularly understand a parameter by a higher surface adhesion for the first material regarding the second material which should regarding the utilization of this film product be exhibited in the stretch forming method. The surface adhesion is thereby particularly greater for the first material as for the second material in the progress of this stretch forming method. Further, this surface adhesion is particularly related to the adhesion of the first material and the second material to a corresponding roller pair of the stretch forming device. Further the environmental parameter of such a stretch forming method particularly the temperature during the performance of the stretch forming method of both materials are preferably to be taken into account for the definition of a higher surface adhesion of in terms of the present invention.

It is possible by the development according to the invention that this film product is applied in a stretch forming method without a holding of the edges or edge sections. The two edge sections adhere stronger or completely by themselves due to the increased surface adhesion at the roller pair of a stretch forming device. Thereby sort of an automatic adhesion is provided for which a Neck-In, a constriction transverse to the stretch forming direction, is reduced or completely avoided. Both materials can thereby differ in their basic concept, particularly different materials like for example Polyethylen (PE), or Polypropylen (PP). Further, it is possible that the materials only differ concerning single parameters particularly concerning their surface condition and/or concerning their melting temperature.

It is particularly of an advantage if regarding the film product according to the invention the characteristic of the surface adhesion is provided by different melting temperatures of both materials. Thereby the melting temperature of the first material is adjusted in a way that a temperature increase during the stretch forming method a partial melting occurs at least of the surface of the edge sections. Thereby the surface adhesion of this first material is clearly increased so that a corresponding adhesion at the corresponding roller section follows. This partial conglutination at the roller leads to the fact that a holding of the film product at the edge section occurs against a reduction of the width of the film product meaning against the so-called Neck-In.

Naturally, this edge section can be shaped in a way that it is subsequently part of the continued-to-use film product. However, it is also possible that this edge section is subsequently cut-off so that exclusively the main section represents the desired produced and longitudinally stretch formed film product.

A product according to the invention can be further developed in a way that the edge sections are performed on the areas of the upper side in the lower side which are adjacent to the edges. With other words it is sufficient when the edge sections in form of a first material are mainly exclusively shaped as the outside layer of the film product in this edge section. Thereby a production can occur for example by a coating of these edge sections with the first material. Thereby it is an advantage if a connection between both materials is established. This can be provided by material closure and/or force closure and/or form closure.

With the embodiment by which the edge sections are provided in the form of a coating particularly an adhesive bonding of these layers can occur. Thereby a film product according to the invention can be produced with particularly minor cost of material and fast production.

It can also be an advantage when by the film product according to the invention the first material of the edge sections extends completely or mainly completely between the upper sides and the lower side. Thereby a particularly simple production can be produced using the co-extrusion machine. In the co-extrusion the first and the second material is extruded and is brought in contact to one another. Due to the fact that both materials are brought in contact in a liquid condition a positive connection can occur between two materials and thereby between the edge sections and the main sections particularly with a butt joint. This is particularly cost-efficient concerning the production. The positive connection particularly with the butt joint between the edge sections and the main sections concerning the mechanic capacity during the stretch forming process is of a great advantage.

It can also be an advantage if by a film product according to the invention the edge sections and the main section overlap at least passionately between the upper side in the lower side. Thereby the abutting surface between the edge sections and the main section is increased so that for example an adhesive connection at the abutting surface an increased adhesion area is provided. Likewise a partially or completely encompassing of the edge section at the corresponding overlapping position of the main section is possible according to the present invention. Thereby also a formfitting fixation of the edge section at the main section can be provided. Particularly, with material matching which are not able to form a positive connection with one another or are generally difficult to connect to one another such an overlapping embodiment can provide advantages.

Another advantage is achieved by the fact that with a film product according to the invention at the push between the first material of the edge section and the second material of the main section at least sectional an adhesion relaying section is assembled. This can particularly be an adhesive film. In this manner also materials can be connected to one another which are not able to alloy a positive connection with one another. Thereby always the same material can be used for the edge section independent from the material of the main section of the film product since there is hardly or on need to consider the compatibility of both materials. This increases the universality of film product according to the invention.

Another advantage can be achieved if the edge sections and the main section of the film product according to the invention are produced by a common coextrusion. This is a particularly cost-efficient production method since the main section is often provided by an extrusion method. Thereby, a corresponding material composition can be applied for example via a flat film extrusion die and upstream two or three extruders which are produced from the injector and during the curing turns to the film product according to the invention. The coextrusion can particularly concerning the different materials be applied particularly cost-efficient and simple. Also the complexity of the production is thereby clearly produced.

It is also an advantage if by the film product according to the invention the first material and the second material differ concerning their surface adhesion under the surrounding conditions of the longitudinal stretch forming method. Particularly, this applies regarding at least one of the following characteristics:

melting temperature,
surface temperature,
surface roughness,
chemical surface characteristics.

Concerning the surface adhesion with this embodiment reference is made to the surrounding conditions of the longitudinal stretch forming method. These surrounding conditions are particularly force and pressure conditions, but mainly temperature conditions during the longitudinal stretch forming method. Accordingly, also particularly the melting temperature is a basic and important differentiating factor, which can be used for the surface adhesion differentiation of both materials. Correspondingly, a reduced melting temperature of the first material leads to an increased surface adhesion under the surrounding conditions of a longitudinal stretch forming method. The corresponding temperature with such a longitudinal stretch forming method can conduct between approximately 80° and approximately 150° according to the material usage. Also the surface structure can be adopted or the roughness can be altered. The edges are thereby for example equipped with particularly plain surfaces in order to increase the adhesion by a great surface contact. Also the chemical surface conditions can be adopted in order to build a corresponding adhesion promoting properties. Thereby particularly hydrogen bridge connections or van-der-Waals forces are to be mentioned in order to increase the surface adhesion.

Likewise subject of the present invention is a method for the production of the film product with a mainly continuous extension with the upper side, a lower side and two lateral proceeding edges. The method according to the invention on this manner is characterized in that at each of both edges of the proceeding edge sections is produced from a first material and between the edge sections a continuous main section is produced from a second material. Thereby the first material comprises higher surface adhesion than the second material. By a method according to the invention a film product particularly with the features according to the present invention is the production result. The production method according to the invention thereby comprises the same advantages like described in detail regarding the film product according to the invention. Particularly, such a film product can subsequently be used in a stretch forming method, like subsequently explained.

The method according to the invention can be further developed by the fact that the edge sections are produced together or mainly together with the main sections by coextrusion. This is a particularly cost-efficient and simple embodiment of the method, since the same procedure can be used for the establishment of the edge sections and the main sections together. Based on the fact that with the coextrusion both materials are brought in context with one another at the same time and in a liquid state, particularly a waste between both materials of each edge section and the adjacent main section can be produced during the production.

Likewise an embodiment of the present invention is a method for stretch forming of a film product, comprising a mainly continuous extension with an upper side, a lower side and two lateral continuing edges. Such a stretch forming method is characterized in that at each of both edges a continuing edge section from a first material and between the edge sections a continuing main section from a second material is assembled. Thereby, the first material comprises a higher surface adhesion as the second material. Further the film product is stretch formed with this stretch forming method between the first roller pair and a second roller pair. Thereby the edge sections adhere at both lateral sections by a higher surface adhesion in order to avoid a constriction of the film product transverse towards the stretch forming direction. The method according to the invention is particularly further developed in a way that the film product is performed according to the present invention. In this manner a stretch forming method according to the invention comprises the same advantages like explained in detail regarding the film product according to the invention.

A stretch forming method according to the invention can be further developed in a way that the edge sections are cut off subsequently to the stretch forming. Advantageously, the cut edge sections are recycled in a way that they can be reimported into the extrusion machine in order to provide the edge sections for a further product. Thereby a mainly complete circuit can be provided for the material of the edge sections so that concerning the material and the costs and the produced waste a further optimization can occur.

The present invention is explained in more detail using the enclosed drawings. The used terms "left", "right", "up" and "down" regard to the arrangement of the figures with normally readable reference numbers. It is shown schematically:

FIG. 1 a first embodiment of a film product according to the invention,

FIG. 2 another embodiment of a film product according to the invention,

FIG. 3 another embodiment of a film product according to the invention,

FIG. 4 an embodiment of a production method according to the invention and

FIG. 5 an embodiment of a stretch forming method according to the invention.

In FIGS. 1 to 3 three different embodiments of the film product 10 according to the invention are shown.

FIG. 1 shows a first embodiment of this film product 10, wherein between the upper side 12 and the lower side 14 a volume from two different materials is assembled. The two materials can be divided in a second material of a main section 20 and a first material of an edge section 20a, which is related to the according edge 16a of the film product 10. With this embodiment the first material extends of the edge section 20a extends mainly completely between the upper side 12 and the lower side 14. Thereby a butt joint is generated between the first material of the edge section 20a and the second material of the main section 30. These two materials are particularly brought in connection to one another in a coextrusion method, so that a positive alignment occurs as connection between the edge section 20a and the main section 30.

FIG. 2 shows another embodiment of the film product 10 according to the invention. With this embodiment the edge sections 20a are only performed at the upper side 12 and the lower side 14 at the corresponding area sections, which are adjacent to the edge 16a. They are particularly provided in the form of a coating or the lining, wherein the first material of the edge sections 20a is connected with the second material of the main section 30 by an adhesion promoter layer 50, particularly in the form of glue. Moreover an overlap of the edge section 20a with the main section 30 occurs in the left/right direction according to FIG. 2. This overlap enables that the push area of the push 40 is increased so that accordingly an increased adhesion area for the adhesion promoter layer 50 is provided.

In FIG. 3 another embodiment of the film product 10 according to the invention is shown. This is an encompassing information of the edge section 20a, so that additionally also formfitting connection between the edge section 20a and the main section 30 is provided. Here also an overlap of the edge section 20a and the edge section 30 resided. The embodiment of FIG. 3 can thereby be understood as a combination of the embodiment of FIG. 1 and FIG. 2.

In FIG. 4 a possibility is shown how a production method according to the invention can appear. Thereby an extrusion device 200 is intended, which comprises their main extruder 210 and two edge extruders 220a, 220b. In this manner the film product 10 according to the invention is developed. Both edge extruders 200a, 220b extrude the first material for the production of the edge sections 20a and 20b, while the main extruder 210 produces the second material for the production of the main section 30. In FIG. 4 the whole extrusion device 200 is shown in a top view, so that the upper side 12 of the film product 10 is to be recognized. The upper edge is recognized as the left edge 16a in conveying direction viewing to the right, while below the right edge 16b can be recognized as a second termination of the continuing film product 10 in conveyance direction. In the same manner also continuing edge section 20a and 20b and a continued main section 30 is developed accordingly.

FIG. 5 shows the variation how a stretch forming method according to the invention can be performed. Thereby two roller pairs 110 and 120 are subsequently assembled. Through the first roller pair 110 a film product 10 is inserted in the longitudinal stretch forming device 100, while through the second roller pair 110 a stretch forming as the stretching in left/right direction occurs with a higher rotation as the first roller pair 110 like shown with the dotted arrow in FIG. 5. By the development of the film product 10 according to the present invention now an increased adhesion of the edge sections 20a and 20b at the roller pairs 110 and 120 can occur, so that a constriction or a reduction of the width of the film product 10 transverse towards the longitudinal direction can be reduced or avoided. With this embodiment the longitudinal stretch forming device 100 further a trimmer device 130 is intended, which cuts the edge sections 20a and 20b subsequent to the stretch forming. The cut edge sections 2a and 20b can be recycled in a way that they are re-conducted to the edge extruders 220a and 200b according to FIG. 3 and thereby introduced into the circuit as raw material.

The previous illustration of the embodiments describes the present invention only within the scope of examples. Naturally single features of the embodiments as they are technically meaningful can be freely combined to one another without leaving the scope of the present invention.

REFERENCE NUMBERS LIST 10 film product
12 upper side
14 lower side
16a edge
16b edge
20a edge section
20b section
30 main section
40 push
50 adhesion promoter layer
100 longitudinal stretch forming device
110 1st roller pair
120 2nd roller pair 130 trimmer device
200 extrusion device
210 main extruder
220a edge extruded
220b edge extruder

The invention claimed is:

1. A film product comprising a film layer being capable of being stretched and including mainly continuing extension with an upper side, a lower side and two lateral continuing edges,
   each of the lateral continuing edges include a continuing edge section from a first material and between the continuing edge sections a continuing main section from a second material is assembled, while the first material comprises a higher surface adhesion as a surface adhesion of the second material as compared to the surface adhesion of the second material;
   wherein the first material differs from the second material concerning the surface adhesion under the surrounding conditions of a longitudinal stretch forming method with at least one of the following properties:
   surface structure;
   surface roughness and
   chemical surface properties.

2. The film product according to claim 1,
   wherein at the area of the upper side and the lower side which is adjacent at the lateral continuing edges the continuing edge sections are developed.

3. The film product according to claim 1,
   wherein the first material of the continuing edge sections extends completely or mainly completely between the upper side and the lower side.

4. The film product according to claim 1,
   wherein the continuing edge sections and the main section at least partially overlap between the upper side and the lower side.

5. The film product according to claim 1,
   wherein at a push between the first material of the continuing edge sections and the second material of the main section at least sectionally an adhesion promoter layer is assembled.

6. The film product according to claim 1,
   wherein the continuing edge sections and the main section are produced by a common coextrusion.

7. A method for producing a film product comprising a step of longitudinally stretch forming a film layer, the film layer including mainly continuing extension with an upper side, a lower side and two lateral continuing edges,
   each of the lateral continuing edges include a continuing edge section from a first material and between the continuing edge sections a continuing main section from a second material is produced, wherein the first material comprises a higher surface adhesion as a surface adhesion of the second material as compared to the surface adhesion of the second material,
   wherein the first material differs from the second material concerning the surface adhesion under the surrounding conditions of the longitudinal stretch forming method with at least one of the following properties:
   surface structure;
   surface roughness and
   chemical surface properties.

8. The method according to claim 7,
   wherein the edge sections are produced in conjunction or mainly in conjunction with the main section via coextrusion.

9. A method for stretch forming a film product comprising a step of stretching a film layer, the film layer including mainly continuing extension with an upper side, a lower side and two lateral continuing edges,
   wherein each of the lateral continuing edges include a continuing edge section from a first material and between the continuing edge sections a continuing main section from a second material is assembled wherein the first material comprises a higher surface adhesion as a surface adhesion of the second material as compared to the surface adhesion of the second material and wherein the film product is stretch formed between a first roller pair and a second roller pair wherein the continuing edge sections adhere at both the first roller pair and the second roller pair via a higher surface adhesion in order to reduce a constriction of the film product transverse to the stretch forming direction
   wherein the first material differs from the second material concerning the surface adhesion under the surrounding conditions of the longitudinal stretch forming method with at least one of the following properties:
   surface structure;
   surface roughness and
   chemical surface properties.

10. The method according to claim 9, wherein subsequently to the longitudinal stretch forming the continuing edge sections are cut.

* * * * *